United States Patent
Enders et al.

(10) Patent No.: US 7,583,181 B2
(45) Date of Patent: Sep. 1, 2009

(54) SUPPLY LINE STRUCTURE FOR SUPPLYING ENERGY TO ELECTRICAL COMPONENTS OF A MOTOR VEHICLE

(75) Inventors: Thorsten Enders, Illingen (DE); Juergen Schirmer, Heidelberg (DE); Frank Stiegler, Karlsruhe (DE); Timo Kuehn, Oetigheim (DE); Klaus Dostert, Krickenbach (DE)

(73) Assignee: Robert Bosch GmbH, Stuttgart (DE)

( * ) Notice: Subject to any disclaimer, the term of this patent is extended or adjusted under 35 U.S.C. 154(b) by 791 days.

(21) Appl. No.: 10/234,868

(22) Filed: Sep. 3, 2002

(65) Prior Publication Data
US 2003/0057771 A1 Mar. 27, 2003

(30) Foreign Application Priority Data
Aug. 31, 2001 (DE) .............................. 101 42 410

(51) Int. Cl.
*G05B 11/01* (2006.01)
*B60L 1/00* (2006.01)

(52) U.S. Cl. ............................ 340/310.15; 340/310.11; 340/310.16; 340/310.17; 370/240; 370/425; 370/446

(58) Field of Classification Search ................. 370/240, 370/425, 446; 340/310.11, 310.15, 310.16, 340/310.17
See application file for complete search history.

(56) References Cited

U.S. PATENT DOCUMENTS 4,594,571 A * 6/1986 Neuhaus et al. ............. 307/10.1
4,700,344 A * 10/1987 Kaino et al. ................. 370/240
4,835,516 A * 5/1989 Kutschera et al. ....... 340/310.02
4,839,530 A * 6/1989 Greenwood ................. 307/10.1
4,942,571 A * 7/1990 Moller et al. ............... 370/407
5,313,460 A * 5/1994 Schmid ...................... 370/438

(Continued)

FOREIGN PATENT DOCUMENTS

DE 39 36 894 5/1991

(Continued)

OTHER PUBLICATIONS

Stiegler, F. et al.: "Konzept einer neuartigen Bordnetzstruktur für den Einsatz von Powerline-Kommunikation im Kfz", Frequence, Schoele und Schon GmbH, Berling, DE, vol. 56, No. 5/6, May 2002, pp. 126-132.—English abstract provided on p. 126 of article.

*Primary Examiner*—Albert W Paladini
*Assistant Examiner*—Hal I Kaplan
(74) *Attorney, Agent, or Firm*—Kenyon & Kenyon LLP

(57) ABSTRACT

A supply line structure for supplying energy to electrical components of a motor vehicle, and for the transmission of information between at least a portion of the components (so-called Powerline Communications). To improve the channel characteristics of the information transmission via the supply line structure, it is proposed that the supply lines be arranged in a star configuration having at least one star point, the or each star point an impedance which corresponds to the characteristic impedance of the individual supply line branches running into it. To that end, it is proposed in particular that at the or each star point, an additional series resistor, frequency-dependent for frequencies below 100 MHz, be disposed in the incoming supply line branches. The series resistor is preferably configured as a ferrite sleeve.

4 Claims, 6 Drawing Sheets

U.S. PATENT DOCUMENTS

| | | | |
|---|---|---|---|
| 5,554,968 A * | 9/1996 | Lee | 340/310.01 |
| 5,592,485 A * | 1/1997 | Consiglieri et al. | 340/2.1 |
| 5,617,282 A * | 4/1997 | Rall et al. | 361/56 |
| 5,734,658 A * | 3/1998 | Rall et al. | 370/438 |
| 6,008,691 A * | 12/1999 | Morita | 327/552 |
| 6,070,114 A * | 5/2000 | Fendt et al. | 701/45 |
| 6,323,756 B1 * | 11/2001 | Yoshikawa et al. | 340/310.01 |
| 6,373,375 B1 * | 4/2002 | Hoetzel et al. | 340/310.12 |
| 6,414,968 B1 * | 7/2002 | Sutterlin et al. | 340/310.02 |
| 6,420,797 B1 * | 7/2002 | Steele et al. | 307/9.1 |
| 6,452,482 B1 * | 9/2002 | Cern | 340/310.01 |
| 6,489,693 B1 * | 12/2002 | Hetzler | 307/10.1 |
| 6,577,230 B1 * | 6/2003 | Wendt et al. | 340/310.01 |
| 6,643,566 B1 * | 11/2003 | Lehr et al. | 713/340 |
| 6,741,162 B1 * | 5/2004 | Sacca et al. | 340/310.01 |
| 6,753,761 B2 * | 6/2004 | Fisher et al. | 340/310.01 |
| 6,842,108 B2 * | 1/2005 | Akiyama et al. | 340/310.01 |
| 2003/0076221 A1 * | 4/2003 | Akiyama et al. | 307/10.1 |

FOREIGN PATENT DOCUMENTS

| | | |
|---|---|---|
| DE | 42 35 616 | 4/1993 |
| DE | 197 03 144 | 7/1998 |
| WO | WO 92/21180 | 11/1992 |

* cited by examiner

SUPPLY LINE STRUCTURE FOR SUPPLYING ENERGY TO ELECTRICAL COMPONENTS OF A MOTOR VEHICLE

FIELD OF THE INVENTION

The present invention relates to a supply line structure for supplying energy to electrical components of a motor vehicle, and for the transmission of information between at least a portion of the components.

BACKGROUND INFORMATION

According to the related art, as a rule the communication in a motor vehicle between various electrical components such as, for example, the door control unit and seat control unit, takes place with the aid of a bus system (e.g. Controller Area Network, CAN). Moreover, new bus concepts are presently being developed in which the communication between the electrical components is intended to take place via a supply line structure that is provided for the energy supply of the electrical components in the motor vehicle. This new bus concept is also known as Powerline Communications. Only a limited operation of the Powerline Communications is possible with the supply line structures existing in motor vehicles today, since because of interferences and reflections, the information to be transmitted via the supply line structure arrives strongly attenuated at the receiving components, or can even no longer be differentiated from interference signals or noise signals.

PCT Publication No. WO 92/21180 describes a supply line structure for Powerline Communications. In this document, the functioning method of a Powerline Communications is explained quite generally, and solutions are addressed for various problems which may occur when implementing a Powerline Communications. Reference is made specifically to this document with regard to the design of a supply line structure for a Powerline Communications, and with respect to the functioning method of a Powerline Communications.

Moreover, the German Patent No. 197 03 144 describes a method for transmitting information in a motor vehicle via a supply line structure. The Powerline Communications described there is limited to use for electrical components of a back-up aid in a motor vehicle. The supply line structure already in the motor vehicle is used for the Powerline Communications without changes or adaptations to the Powerline Communications.

Finally, the German Published Patent Application No. 39 36 894 describes a bus system for transmitting information between electrical components of a motor vehicle. The bus system may also have a star configuration. However, a T-shaped or a ring-shaped network is conceivable, as well. A particularly simply designed, but nevertheless reliable bus system is proposed in this document. Adaptation of the line structure to specific marginal conditions in the transmission of information is not addressed. Such an adaptation is also not necessary in the bus system described, since these marginal conditions only exist in the case of a Powerline Communications via an existing supply line structure.

SUMMARY OF THE INVENTION

An object of the present invention is to develop a supply line structure of a motor vehicle in such a way as to ensure information transmission which is as undisturbed as possible between electrical components that are supplied with energy by the supply line structure. In particular, the intention is to prevent reflections occurring in the supply line structure, while continuing to ensure the energy supply of the electrical components via the supply line structure.

To achieve this objective, starting from the supply line structure of the type indicated at the outset, the present invention proposes that the supply lines be arranged in a star configuration having at least one star point, the or each star point exhibiting an impedance which corresponds to the characteristic impedance of the individual supply line branches running into it.

It has been shown that, as part of the introduction of Powerline Communications within a motor vehicle as a concept for the transmission of information between individual electrical components of the motor vehicle, the restructuring of the existing supply line structure (cable harness) proves to be useful for improving the channel characteristics (constant attenuation characteristic and fewest possible reflections). Due to the improved channel characteristics, the information transmission becomes predictable and better calculable. The layout of the supply line structure may thereby be optimized for the transmission of information, without the energy supply of the connected components via the supply line structure being impaired. Thus, information may be transmitted relatively without difficulty between the electrical components via the supply line structure of the motor vehicle.

According to the present invention, it has been recognized that the channel characteristics may be significantly improved if the supply lines are arranged in a star configuration having one or more star points. To avoid reflections at a star point, it has an impedance which corresponds to the characteristic impedance of the individual supply line branches running into it.

According to one advantageous further development of the present invention, it is proposed that at the or each star point, an additional series resistor be disposed in the incoming supply line branches. By an additional series resistor arranged in a branch, it is possible to perceptibly reduce the reflection factor of the branch, and possibly even reduce it to zero.

According to one preferred specific embodiment of the present invention, it is proposed that the series resistor have the same resistance value in all supply line branches. This specific embodiment starts from the matched case, according to which all supply line branches are terminated in their characteristic impedances. Moreover, it is assumed that all lines have the same characteristic impedance. This simplification may readily be carried out, since these marginal conditions can be satisfied in a relatively simple manner in a supply line structure by suitable measures.

The value of the series resistor at the star point is advantageously yielded by the equation:

$$r^*_{star} = \frac{Z_{series} \cdot n + Z_L(2-n)}{Z_{series} \cdot n + Z_L \cdot n}$$

with a reflection factor $r^*_{star}$ and a number n of supply line branches running into the star point, the reflection factor being yielded at a supply line branch in which an incoming wave is running, and by consideration of the series resistor in this branch. In accordance with the present invention, the reflection factor is selected to be as small as possible.

If the reflection factor is reduced to zero, which represents the ideal case, the value of the series resistor at a star point is yielded by the equation:

$$Z_{series} = Z_L \cdot \frac{n-2}{n}$$

According to another advantageous further development of the present invention, the series resistor is frequency-dependent for direct voltage, particularly below a frequency of 100 MHz. In particular, it is proposed that the series resistor at a frequency of 0 Hz have a very small resistance value, preferably 0 ohm, and in a frequency range of interest for a Powerline Communications, particularly in a frequency range above 100 MHz, have a particular resistance value. In the frequency range of 100 MHz to approximately 250 MHz, the resistance value is nearly constant.

Finally, it is proposed that the series resistor take the form of at least one ferrite sleeve which is disposed in the region of the star point around the connecting line. It is crucial that a ferrite be arranged around the line. Whether the ferrite is sleeve-shaped or is configured differently is of only secondary importance.

DETAILED DESCRIPTION

The present invention relates to a supply line structure (so-called electrical system) for supplying energy to electrical components of a motor vehicle. In order to optimize the supply line structure for the transmission of information (so-called Powerline Communications) without, however, impairing the energy supply of the components in so doing, the present invention proposes transforming the supply line structure into a star configuration having one or more star points. The or each star point exhibits an impedance which corresponds to the characteristic impedance of the individual supply line branches running into the star point.

According to the present invention, ferrite cores are used for generating a frequency-dependent impedance of the star point. For direct voltage, the impedance of the star point is yielded at 0 ohm, which means that the direct-voltage supply of the connected components may also continue to be implemented without additional voltage drop. For frequencies above 100 MHz, an impedance results having a constant active component and negligible reactive component. The active component may be used for adapting the star point to the characteristic impedance of the lines used within the cable harness. Reflections at the star point are thereby avoided above 100 MHz.

The following advantages are associated with the use of the modified star point for a possible transmission system based on the principle of the Powerline Communication:

symmetrical layout of the cable harness selectivity of the connected components simple integration of new components constant transfer function in the range from 100 to 250 MHz linear phase response in the range from 100 to 250 MHz no direct voltage losses the characteristic impedance of the connecting line branches is independent both of the line length and of the position of the utilized conductors within the motor vehicle.

Figure 1:
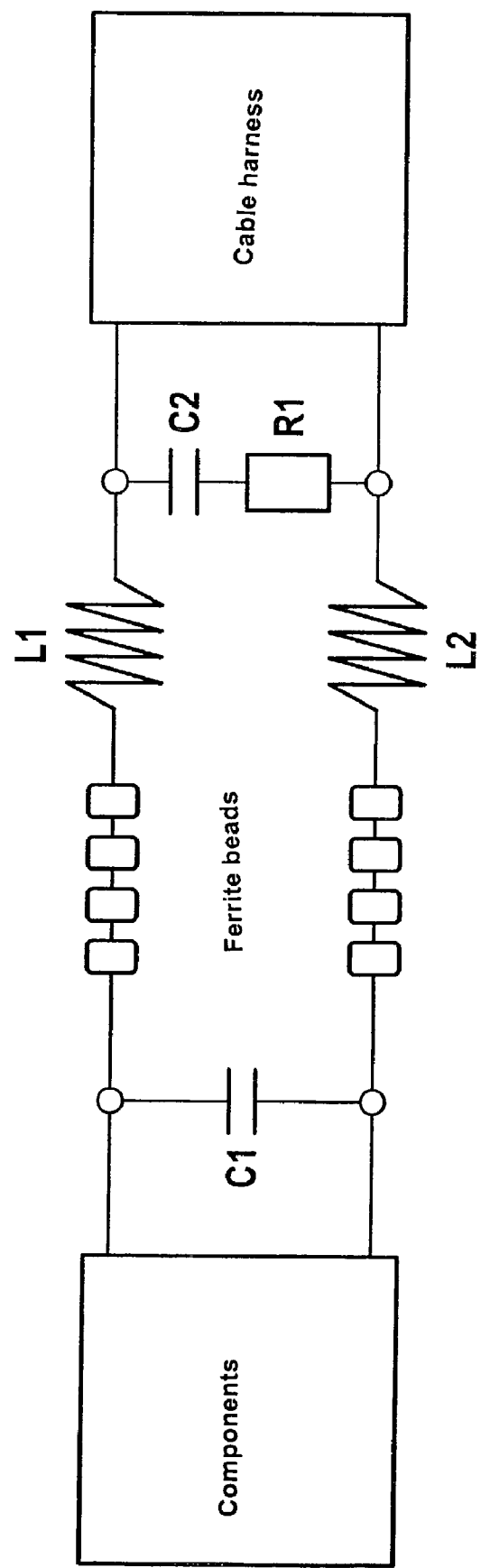
FIG. 1 shows an adapter circuit for the connection of an electrical component of a motor vehicle to a supply line structure for the energy supply of the components.

The restructuring of the existing supply line structure proves to be useful as part of the introduction of Powerline Communications within a motor vehicle as a concept for the transmission of information between individual electrical components of the motor vehicle. Possibilities in this connection are the use of adapter circuits for the connected components, the use of twisted pair lines and the reduction of reflections in terms of amount by reducing the number of branchings. FIG. 1 shows a possible implementation of such an adapter circuit. To improve the channel characteristics, the supply lines are arranged in a star configuration. A constant attenuation characteristic and a decrease of reflections may thereby be achieved. To improve the interference immunity, twisted pair lines are used for the supply lines.

It has been shown that the utilization of twisted pair lines as conductor media offers decisive advantages, particularly a perceptible improvement in interference immunity. They exhibit different characteristic impedances depending upon their degree of twisting. For the length of lay (height of rise in the stranding of symmetrical cable pairs specific to 1 m) useful for application in Powerline Communications, in a sufficiently accurate approximation, a characteristic impedance of approximately 100 ohm occurs for cable of different cross-sections. To avoid reflections at a star point, the star point is provided with an impedance which corresponds to the characteristic impedance of the individual twisted pair lines running into it.

Because of the parallel connection of a plurality of branches, in general, the star point of a star configuration has a lower impedance than the characteristic impedance of the lines. Therefore, reflections occur at the star point. If all lines terminate in their characteristic impedance $Z_L$, then the wave running to the star point "sees" the star point as impedance $Z_{star}$, which results from the parallel connection of the remaining branches. In the matched case (all line branches are terminated in their characteristic impedances $Z_L$), and on condition that all supply lines have the same characteristic impedance $Z_L$, the star impedance $Z_{star}$ for an n-branching therefore is given by:

$$Z_{star} = \frac{Z_L}{(n-1)} \text{ for } n \geq 2 \tag{1}$$

The reflection factor at star point $r_{star}$ is consequently calculated at:

$$r_{star} = \frac{Z_{star} - Z_L}{Z_{star} + Z_L} = \frac{2-n}{n} \text{ for } n \geq 2 \quad (2)$$

Figure 2:
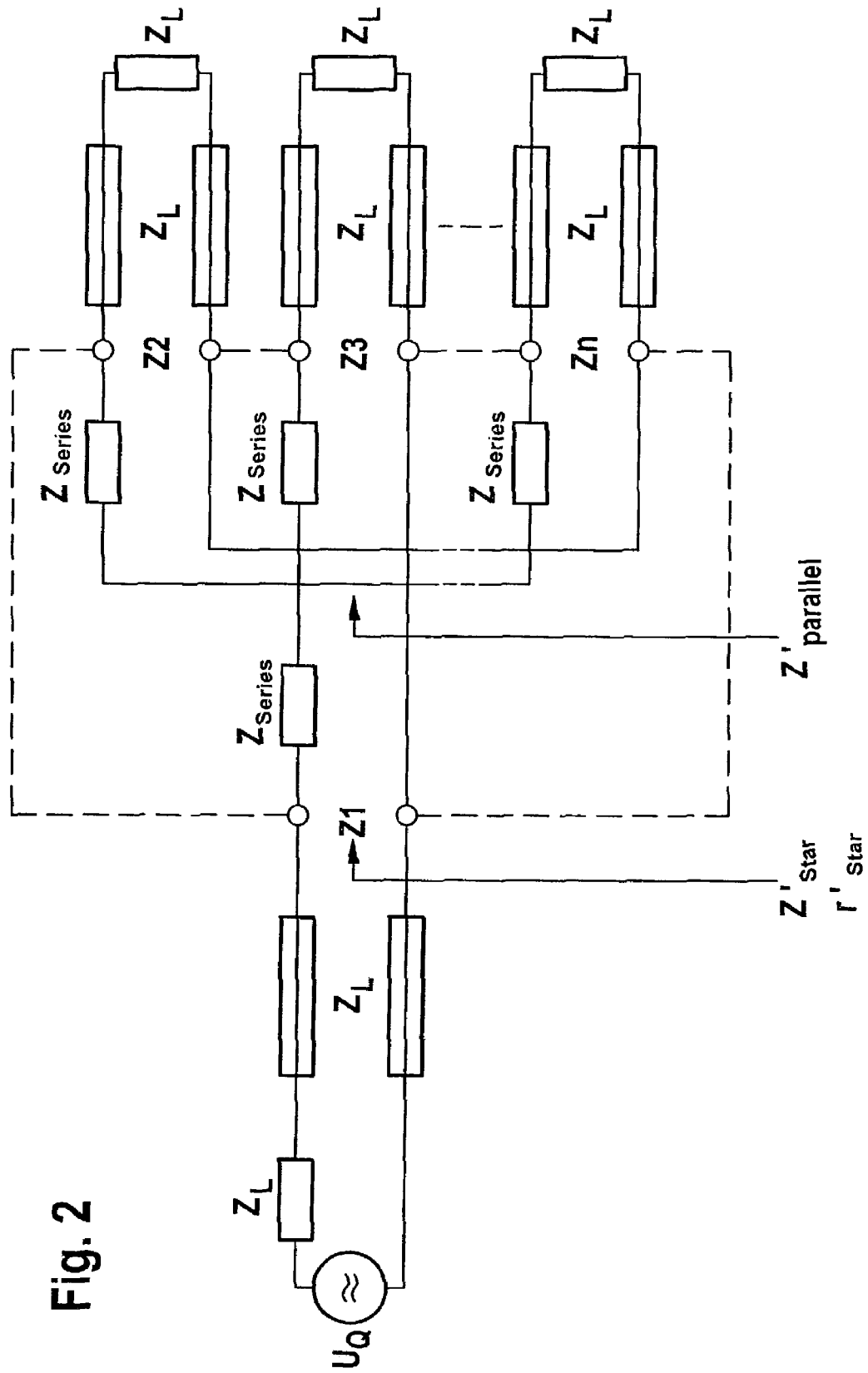
FIG. 2 shows an equivalent circuit diagram of a supply line structure according to the present invention having n branchings.

As equation (2) shows, the amount of reflection factor $r_{star}$ increases with rising number n of branchings. According to the present invention, reflection factor $r_{star}$ should be minimized, preferably reduced to zero, since by this means, no reflections occur. This is achieved by inserting an additional series resistor $Z_{series}$ directly at the star point in each of supply line branches Z1, Z2, Z3, Zn. The equivalent circuit diagram of a star point of an n-branching modified in this manner is shown in FIG. 2 for illustration.

Thus, yielded for the parallel connection of the remaining branches (all branches except for that in which the incoming wave is running), is impedance $Z^*_{parallel}$:

$$Z^*_{parallel} = \frac{Z_L + Z_{series}}{(n-1)} \text{ for } n \geq 2 \quad (3)$$

In addition, for new star impedance $Z^*_{star}$, that series resistor $Z_{series}$ is also taken into account which is located in the branch in which the incoming wave is running. Thus the new star impedance $Z^*_{star}$ is given by:

$$Z^*_{star} = Z^*_{parallel} + Z_{series} = \frac{Z_L + Z_{series}}{(n-1)} + Z_{series} \text{ for } n \geq 2 \quad (4)$$

and for new reflection factor $r^*_{star}$ at the new "star point":

$$r^*_{star} = \frac{Z^*_{star} - Z_L}{Z^*_{star} + Z_L} = \frac{Z_{series} \cdot n + Z_L \cdot (2-n)}{Z_{series} \cdot n + Z_L \cdot n} \text{ for } n \geq 2 \quad (5)$$

Since reflection factor $r^*_{star}$ should become zero, the requirement for additional series resistor $Z_{series}$ for an n-branching follows from equation (5):

$$Z_{series} = Z_L \cdot \frac{(n-2)}{n} \text{ for } n \geq 2 \quad (6)$$

Since the same series resistor $Z_{series}$ used in each branch of the modified star point, no preferred data-transmission direction is taken into account. In principle, this means that the wave running to the star point may occur at each branch, without the wave experiencing a reflection. This is an important prerequisite for a bidirectional data-transmission system, which is also the aim for Powerline Communications in a motor vehicle. In this connection, however, it is taken into consideration that series resistors $Z_{series}$ also represent additional losses for the data signals.

Figure 3:
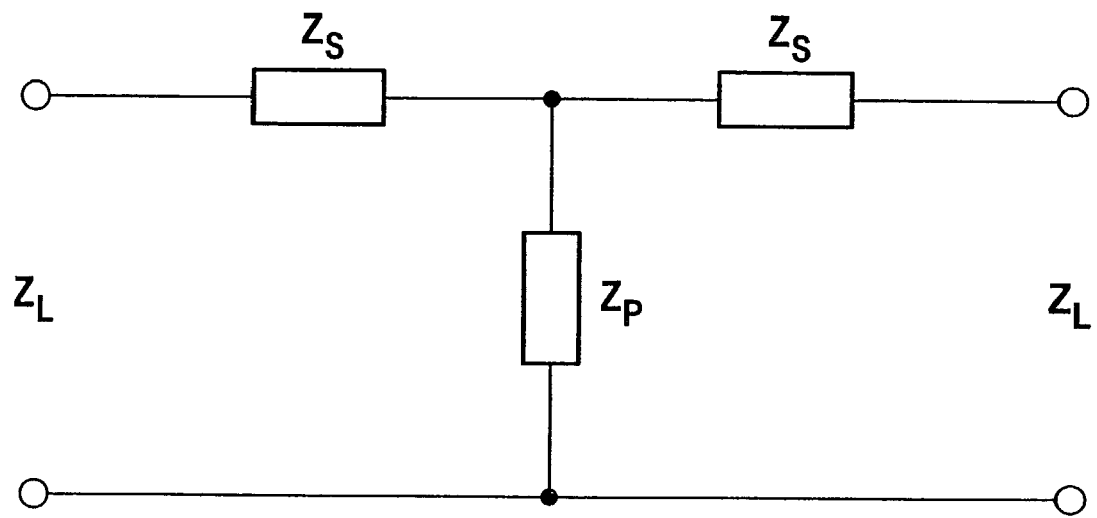
FIG. 3 shows an equivalent circuit diagram of a symmetrical T-element.

The further parameters of an n-branching with modified star point may be calculated with the aid of a symmetrical T-element (see FIG. 3). If FIG. 2 is compared to FIG. 3, then parallel impedance $Z_p$ corresponds to the parallel connection of (n−2) terminated supply line branches of the star point. Since each branch has an additional series resistor $Z_{series}$ directly at the star point, the impedance per branch $Z^*_{branch}$ is calculated from:

$$Z^*_{branch} = Z_L + Z_{series} \quad (7)$$

In this context, it is naturally assumed that the supply lines are each terminated in their impedances. Thus, parallel impedance $Z_p$ can be stated and, with the aid of equation (6), be converted accordingly to:

$$Z_p = \frac{Z_L + Z_{series}}{n-2} = Z_L \cdot \frac{2}{n} \cdot \frac{n-1}{n-2} \text{ for } n \geq 2 \quad (8)$$

Serial impedance $Z_s$ corresponds to series resistor $Z_{series}$, and using equation (6), may be stated as follows:

$$Z_s = Z_L \cdot \frac{n-2}{n} \text{ for } n \geq 2 \quad (9)$$

The n-branching having a modified star point corresponds to an n-port. However, for the measurement of linear networks, it is sufficient in each case to measure only the signal transmission between two ports, and to terminate the other ports free from reflections. Thus, the complete S-matrix of any n-port may be determined by the measurement at any possible pair of ports. Since this factual situation is present in FIG. 2 (all further ports are terminated in their impedance and combined in parallel impedance $Z_p$), and, in addition, all branches—as already explained—have the same structure, the S-parameters of the complete n-port may easily be stated at:

$$S_{ij} = \begin{cases} 0 \\ 1 \text{ for } i = j \\ \frac{1}{n-1} \text{ for } i \neq j \end{cases} \text{with } i, j \in \{1, \ldots n\}; n \geq 2 \quad (10)$$

From this, the freedom from reflections with respect to the decisive parameters $s_{ii}$ is apparent.

If the modified star point is considered from the aspect of Powerline Communications in the motor vehicle, then additionally installed series resistor $Z_{series}$ causes losses in direct-voltage applications. Since, however, they are not acceptable (increased energy consumption in direct-voltage applications), different components are used for implementing the modified star point. The demands on such components correspond to frequency-dependent resistances which, at a frequency of 0 Hz have a resistance value of 0 ohm, and in the frequency range of interest for the transmission of information via the supply line structure, one of above 100 MHz, have a resistance value of $Z_{series}$. Here, the use of the magnetic material ferrite would provide a solution.

Impedance Z of a coil is calculated at:

$$Z = j \cdot 2\pi f \cdot L \quad (11)$$

In this context, L is the inductance of the coil, which in turn is made up of the inductance of the associated air coil $L_0$ and relative permeability $\mu_r$ of the coil core.

$$L = \mu_r \cdot L_0 \quad (12)$$

Relative permeability $\mu_r$ is possibly a complex quantity. At least this is the case when the hysteresis loop opens to a measurable area. Relative permeability $\mu_r$ is then composed of a real part and imaginary part, the imaginary part representing the magnetic core losses. The general notation, which is primarily valid in the case of small driving and sinusoidal magnetization conditions, reads:

$$\mu_r = \mu'_r - j \cdot \mu''_r \quad (13)$$

If equation (12) and equation (13) are substituted into equation (11), one then obtains the general impedance Z of a coil:

$$Z = j \cdot 2\pi f \cdot (\mu'_r - j \cdot \mu''_r) \cdot L_0 = j \cdot 2\pi f \cdot \mu'_r \cdot L_0 + 2\pi f \cdot \mu''_r \cdot L_0 \text{ where}$$
$$L_s = \mu'_r \cdot L_0 \text{ and } R_s = \mu''_r \cdot L_0 \quad (14)$$

Figure 4:
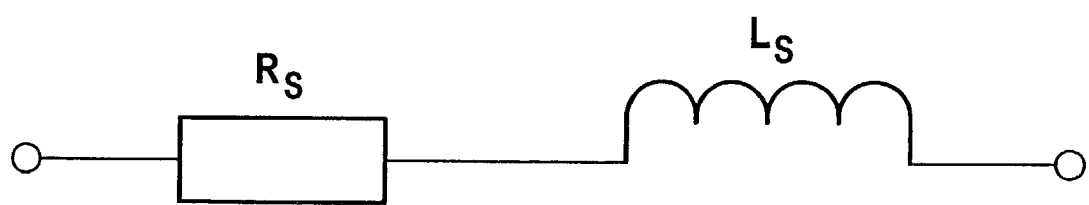
FIG. 4 shows a series equivalent circuit diagram of a real coil.

In this context, equation (14) is composed as the sum of reactive impedance and ohmic loss resistance. In an equivalent circuit diagram, the coil may thus be understood as a series connection of ohmic resistor $R_s$ and ideal coil $L_s$ (see FIG. 4). The respective components may be ascertained from equation (14). In this case, ohmic resistor $R_s$ represents the loss term of the real coil.

In the case of magnetic materials, with a field strength increasing over the so-called Rayleigh region (hysteresis loops are approximated by narrow, lancet-shaped hysteresis loops, i.e. by two parabolic curves), the typical loss mechanisms also become increasingly active. In response to magnetic reversal processes in alternating fields with larger amplitudes, one should expect nucleation, rotation processes, as well as reversible and irreversible wall movements. With each of these processes, the direction of the local magnetization is reset. However, they behave like mechanical circuits which, given a change in the magnetic field, are induced to precision movements. In this context, the movement energy is distributed on other spins as well as on the lattice, and is thus converted into heat. This loss mechanism is known as spin relaxation. The damping of the precision movement for the first time permits the adjustment of a stationary polarization direction in the direction of the outer field. Each change of the magnetic polarization by the displacement of Bloch walls or by coherent rotation is additionally an occasion for eddy currents. Since these counteract the cause, a delay in the magnetization processes results. The eddy-current relaxation is also associated with additional losses. Given the Bloch wall displacement, these relaxation processes act like a friction term. From the motion equation for the Bloch wall, one finally obtains complex relative permeability $\mu_r$ normalized to initial permeability $\mu_i$:

$$\frac{\mu_r}{\mu_i} = \frac{1}{\mu_i} + \frac{1 - \frac{1}{\mu_i}}{1 - \omega^2 \frac{m}{\alpha} + j \cdot \omega \cdot \frac{\beta_R}{\alpha}} \quad (15)$$

In equation (15), m is the "inert" mass of the Bloch wall per area of wall, and $\beta_R$ is the damping constant per unit of area, which is made up of the share of the spin relaxation and the share of the eddy-current relaxation. $\alpha$ is a binding constant per unit of area. Thus, the wall movement corresponds to an oscillation with the angular frequency $\omega$. At $\omega_0$, the oscillating wall has a resonant frequency $$\omega_0 = \sqrt{\frac{\alpha}{m}} \quad (16)$$

and a relaxation constant $\omega_c$:

$$\omega_c = \frac{\alpha}{\beta_R} = \frac{1}{\tau} = 2\pi f_c \quad (17)$$

For a small effective Bloch wall mass, i.e. for a low frequency relative to resonant frequency $\omega_0$, one may make the assumption $(m \cdot \omega^2/\alpha) = (\omega^2/\omega_0^2) << 1$, and thus for the normalized complex relative permeability $\mu_r$, obtain $$\frac{\mu_r}{\mu_i} = \frac{1}{\mu_i} + \frac{1 - \frac{1}{\mu_i}}{1 + j \cdot \frac{f}{f_c}} \quad (18)$$

while for high frequencies ($f >> f_c$), the assumption $f^2/f_c^2 >> 1$ applies. From this, there follows from equation (18):

$$\frac{\mu'_r}{\mu_i} \approx \frac{1}{\mu_i} + \frac{1 - \frac{1}{\mu_i}}{\frac{f^2}{f_c^2}} \text{ and} \quad (19)$$

$$\frac{\mu''_r}{\mu_i} \approx \frac{1 - \frac{1}{\mu_i}}{\frac{f^2}{f_c^2}} \cdot \frac{f}{f_c} = \left(1 - \frac{1}{\mu_i}\right) \cdot f_c \cdot \frac{1}{f} \quad (20)$$

Finally, if equation (19) and equation (20) are substituted into equation (14), one obtains the components of the lossy coil for high frequencies ($f >> f_c$):

$$L_S = L_0 \left(1 + \frac{f_c^2}{f^2} \cdot (\mu_i - 1)\right) \quad (21)$$

and $$R_s = 2\pi f_c \cdot (\mu_i - 1) \cdot L_0 = \text{const} \cdot (f) \quad (22)$$

If one looks at the result of series equivalent resistance $R_s$ of the lossy coil, its frequency dependence can only be recognized in the lower frequency range (see equation (14)). In this context, at frequency f=0 Hz, series equivalent resistance $R_s$=0 ohm, that is to say, for direct-voltage applications, one may start out from a nearly no-loss coil. In frequency ranges far above frequency $F_c$, series equivalent resistance $R_s$ relative to the frequency is quasi constant and greater than zero (see equation (22)). In this frequency range, ohmic losses and dampings occur.

For high frequencies ($f >> f_c$), reactive impedance $X_s$ of a lossy coil turns out to be:

$$X_s = 2\pi f \cdot L_0 \left(1 + \frac{f_c^2}{f^2} \cdot (\mu_i - 1)\right) \quad (23)$$

In general, the reactive impedance of the associated air coil may be omitted in the first summand. If, under these additional assumptions, ohmic loss resistance $R_s$ (see equation (22)) is compared to reactive impedance $X_s$ (see equation (23)) for high frequencies $f >> f_c$, it can be seen that $R_s >> X_s$ applies.

That is to say, the active component of the lossy coil is considerably higher for high frequencies $f \gg f_c$ than the reactive component. Therefore, the reactive impedance may be omitted at high frequencies.

A demonstration layout of a supply line structure according to the present invention based on the modified star point was implemented using ferrites. For series resistors $Z_{series}$ discussed above, ferrite sleeves (or alternative ferrite beads or double-hole core ferrites) are put over the individual supply-line litz wires.

Figure 5:
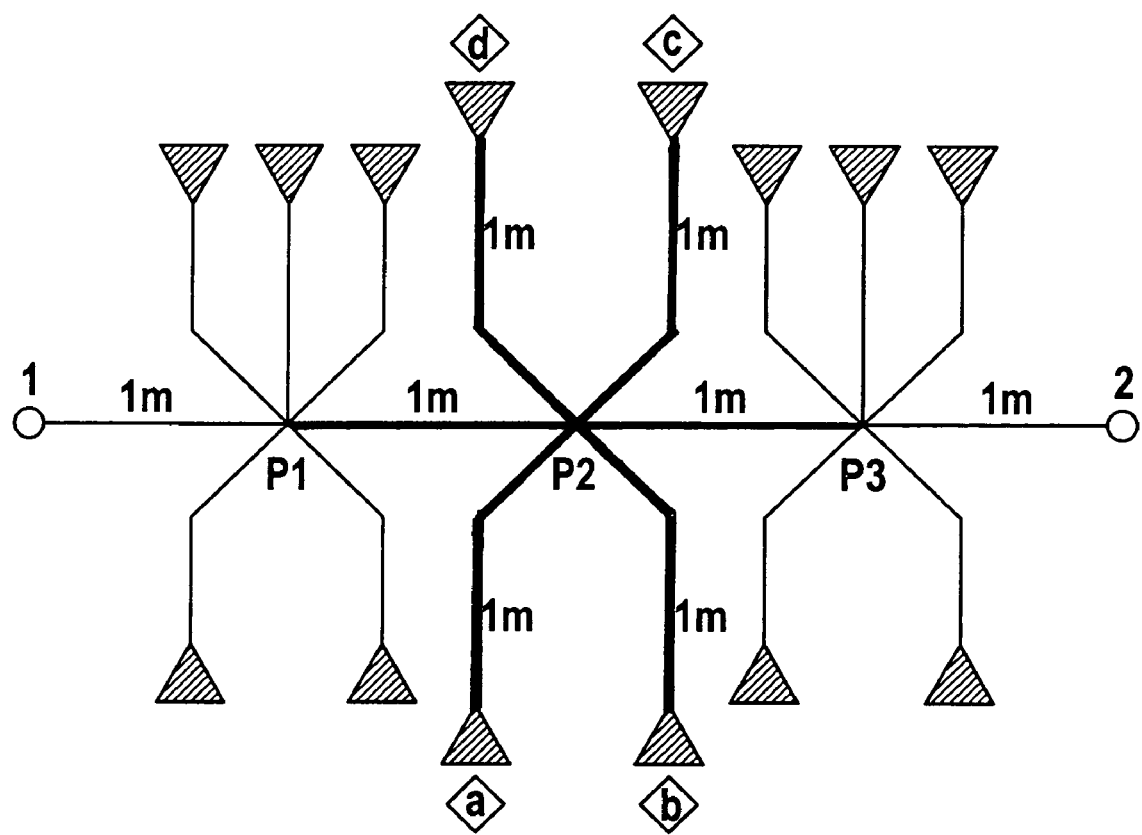
FIG. 5 shows a design of a motor-vehicle electrical system having the supply line structure of the present invention according to a preferred specific embodiment.

The supply line structure of the present invention shown in FIG. 5 is made of three modified star points. For that, in addition two different twisted-pair lines (conductor cross-section 0.75 mm² and 2.5 mm²) are used. The different conductor cross-sections of the two lines are indicated in FIG. 5 by different line thicknesses. Star point P2 represents the main branching point. It may take over the task of a central fuse box. Branches go out from it in different directions to subordinate branchings (star point P1 and star point P3). In a motor vehicle, these subordinate branchings may be installed, for example, in the doors, in the trunk, etc. From there, they supply the control units or terminals installed in this region with energy and information (in the door, for example, the central locking system, the electric power-window unit, the electrically adjustable exterior mirror and operating control elements). Instead of terminations a, b, c and d in FIG. 5, in each case a further subordinate branching may be connected. Since without exception, it is a question of modified star points, these extensions would not influence the transfer function of the structure in FIG. 5 (from star point P1 to star point P2).

Figure 6:
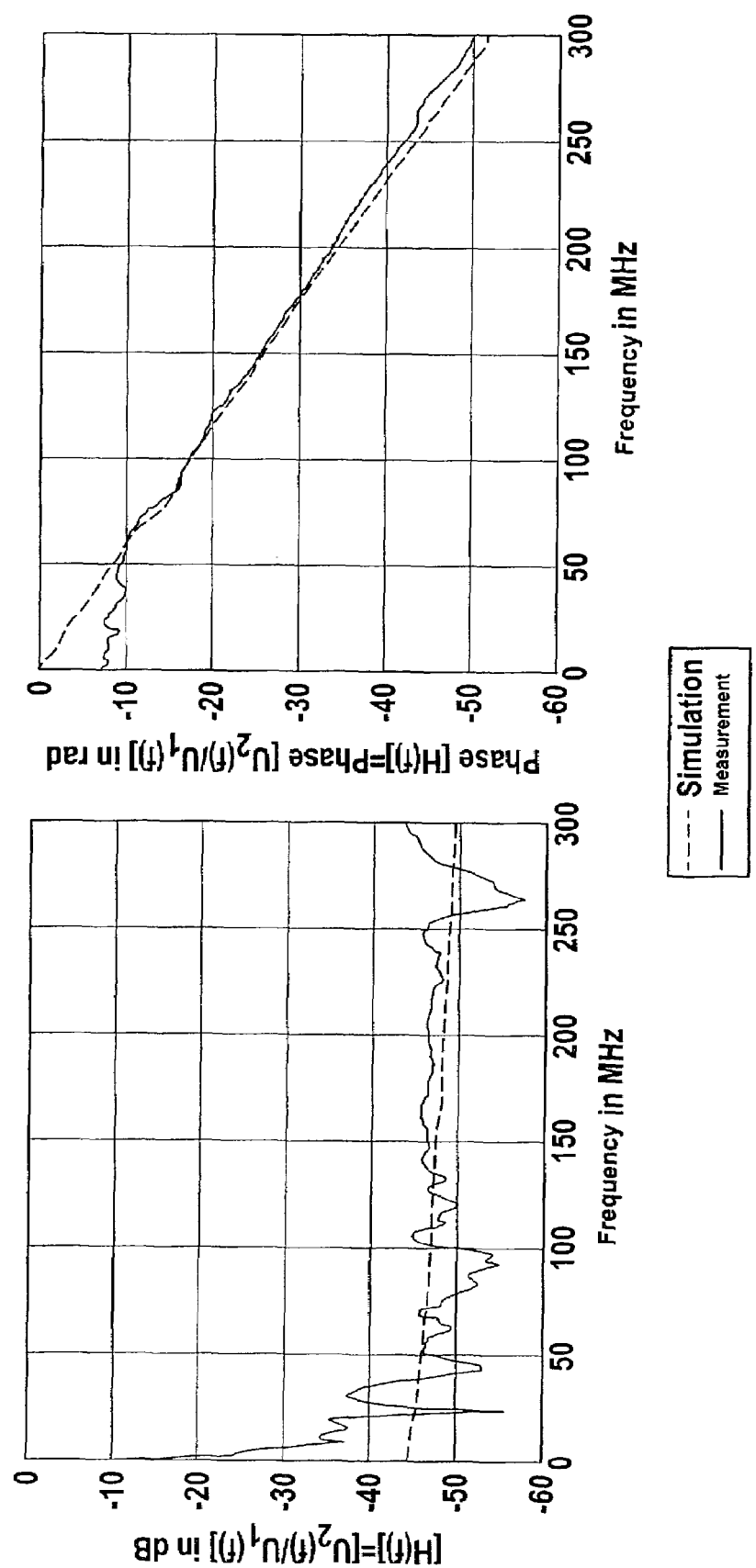
FIG. 6 shows a transfer function and a phase response of a measurement of the motor-vehicle electrical system from FIG. 5.

As already mentioned, the modified star points were produced with double-hole core ferrites. The transfer function of this structure is shown in FIG. 6. Both the measuring curve and a simulation curve ascertained with a simulation tool were shown in the diagram.

As FIG. 6 shows, the measuring results for some frequency ranges deviate relatively sharply from the results of the simulation. In the lower frequency range to approximately 50 MHz, this may be attributed to the fact that in the simulation frequency, independent series resistors were used for the modified star point, while in the measurement setup, ferrites were used as series resistors. The other deviations may be attributed, inter alia, to interferences. Since the signal level, attenuated by 50 dB, is surely in the range of the interference levels, these interferences now also become visible in the transfer function. The deviations may also be because in the real modified star point, it is not possible to reach an absolute freedom from inherent reflections. Therefore, reflections would occur repeatedly, which, however, would appear generally in a periodic behavior in the transfer function. However, since this is not the case here, it may be assumed that the formation of multireflections is substantially eliminated. In spite of this deviation between simulation and measurement, a trend which conforms with the simulation is recognizable in the measurement. This is true particularly in the frequency range between 100 MHz and 250 MHz which is especially important for the Powerline Communications. In this frequency range, it may be said that the attenuation characteristic of the transfer function is nearly constant, and the phase response is nearly linear. Therefore, in this range the linear distortions on the transmission channel are held in acceptable limits.

Figure 7:
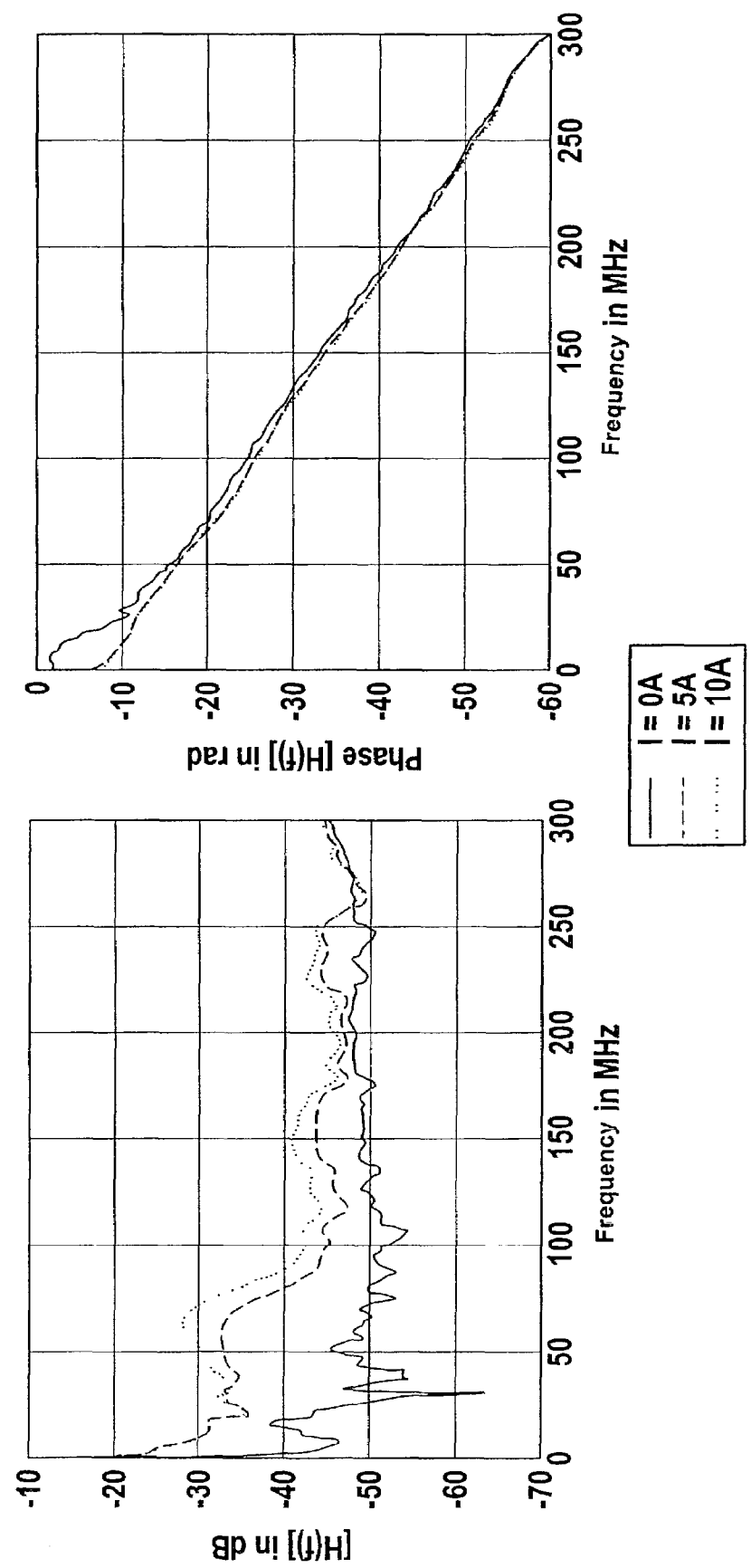
FIG. 7 shows a transfer function and the phase response from FIG. 6 as a function of a direct-current load of the electrical system.

FIG. 7 shows the behavior of the transfer function of the supply line structure according to the present invention as a function of the direct-current load. To this end, a front headlight unit of a vehicle in the upper midsize category was connected to the star configuration of the present invention and supplied with direct current. Sets of curves of the transfer function and the phase response, shown in FIG. 7, resulted.

If one looks at the phase response of the transfer function from FIG. 7, an approximate linearity may be recognized in a frequency range above 50 MHz. The phase response in this range turns out to be largely independent of the direct-current load. Only in the attenuation characteristic may a dependence on the direct-current load be determined in this frequency range, as well. However, the dependency in a frequency range above 150 MHz turns out to be less by far than at frequencies below 100 MHz. In addition, the attenuation characteristic in smaller frequency bands may in each case be assumed as approximately constant. Moreover, a substantial independence from the direct-current load may be found in the frequency range between 180 MHz and 220 MHz. In this frequency range, it is possible to transmit information via the supply line structure (Powerline Communications) without the information signals experiencing linear distortions.

What is claimed is:

1. A supply line structure for supplying energy to electrical components of a motor vehicle and for transmitting information between at least a portion of the electrical components, comprising:
   supply lines arranged in a star configuration having at least one star point, the at least one star point exhibiting an impedance corresponding to a characteristic impedance of individual supply line branches running thereinto, wherein each supply line is used to transmit both energy and information across a single wire;
   wherein an additional series resistor is arranged at the at least one star point in each of the individual supply line branches;
   wherein the additional series resistor is frequency-dependent below a frequency of 100 MHz, whereby at a frequency of 0 Hz, the additional series resistor has a resistance value of substantially 0 ohm, and in a frequency range above 100 MHz for transmission of information via a supply line, the additional series resistor has a resistance value of $Z_{series}$; and
   wherein a value of the additional series resistor at the at least one star point is yielded by the equation:

$$r^*_{star} = \frac{Z_{series} \cdot n + Z_L(2-n)}{Z_{series} \cdot n + Z_L \cdot n}$$

with a reflection factor $r^*_{star}$ and a number n of individual supply line branches having a character impedance $Z_L$ feeding into the at least one star point, wherein n is greater than or equal to two, the reflection factor ($r^*_{star}$) being yielded at one of the individual supply line branches in which an incoming wave is running, and by consideration of the additional series resistor, $Z_{series}$, in the one of the individual supply line branches.

2. A supply line structure for supplying energy to electrical components of a motor vehicle and for transmitting information between at least a portion of the electrical components, comprising:
   supply lines arranged in a star configuration having at least one star point, the at least one star point exhibiting an impedance corresponding to a characteristic impedance of individual supply line branches running thereinto, wherein each supply line is used to transmit both energy and information across a single wire;

wherein an additional series resistor is arranged at the at least one star point in each of the individual supply line branches;

wherein the additional series resistor is frequency-dependent below a frequency of 100 MHz, whereby at a frequency of 0 Hz, the additional series resistor has a resistance value of substantially 0 ohm, and in a frequency range above 100 MHz for transmission of information via a supply line, the additional series resistor has a resistance value of $Z_{series}$;

wherein each additional series resistor has the same resistance value in all individual supply line branches; and wherein a value of the additional series resistor at the at least one star point is yielded from the equation:

$$Z_{series} = Z_L \cdot \frac{n-2}{n}$$

with a number n of individual supply line branches, wherein n is greater than or equal to two, $Z_L$ is a character impedance and $Z_{series}$ is a series resistor.

3. A supply line structure for supplying energy to electrical components of a motor vehicle and for transmitting information between at least a portion of the electrical components, comprising:

supply lines arranged in a star configuration having at least one star point, the at least one star point exhibiting an impedance corresponding to a characteristic impedance of individual supply line branches running thereinto, wherein each supply line is used to transmit both energy and information;

an additional series resistor arranged at the at least one star point in each of the individual supply line branches; and a value of the additional series resistor at the at least one star point is yielded by the equation:

$$r^*_{star} = \frac{Z_{series} \cdot n + Z_L(2-n)}{Z_{series} \cdot n + Z_L \cdot n}$$

with a reflection factor $r^*_{star}$ and a number n of individual supply line branches having a character impedance $Z_L$ feeding into the at least one star point, wherein n is greater than or equal to two, the reflection factor ($r^*_{star}$) being yielded at one of the individual supply line branches in which an incoming wave is running, and by consideration of the additional series resistor, $Z_{series}$, in the one of the individual supply line branches.

4. A supply line structure for supplying energy to electrical components of a motor vehicle and for transmitting information between at least a portion of the electrical components, comprising:

supply lines arranged in a star configuration having at least one star point, the at least one star point exhibiting an impedance corresponding to a characteristic impedance of individual supply line branches running thereinto, wherein each supply line is used to transmit both energy and information;

an additional series resistor arranged at the at least one star point in each of the individual supply line branches, wherein each additional series resistor has the same resistance value in all individual supply line branches; and a value of the additional series resistor at the at least one star point is yielded from the equation:

$$Z_{series} = Z_L \cdot \frac{n-2}{n}$$

with a number n of individual supply line branches, wherein n is greater than or equal to two, $Z_L$ is a character impedance and $Z_{series}$ is a series resistor.

* * * * *

UNITED STATES PATENT AND TRADEMARK OFFICE
CERTIFICATE OF CORRECTION

PATENT NO. : 7,583,181 B2 Page 1 of 1
APPLICATION NO. : 10/234868
DATED : September 1, 2009
INVENTOR(S) : Enders et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this

Fourteenth Day of September, 2010

David J. Kappos
*Director of the United States Patent and Trademark Office*